United States Patent
Papetti

(10) Patent No.: US 7,044,664 B2
(45) Date of Patent: May 16, 2006

(54) PRESCRIPTION DRUG PRINTER WITH DRUG VERIFICATION INDICIA AND METHOD FOR USE THEREOF

(76) Inventor: Stephen Papetti, #7, Tricorne Ct., Holmdel, NJ (US) 07733

( * ) Notice: Subject to any disclaimer, the term of this patent is extended or adjusted under 35 U.S.C. 154(b) by 133 days.

(21) Appl. No.: 10/870,565

(22) Filed: Jun. 17, 2004

(65) Prior Publication Data

US 2005/0281601 A1   Dec. 22, 2005

(51) Int. Cl.
  *B41J 2/22*   (2006.01)
  *B41J 5/30*   (2006.01)
(52) U.S. Cl. .................... 400/124.01; 400/62
(58) Field of Classification Search .......... 400/124.01, 400/62; 358/302; 156/249; 206/534; 283/81, 283/67, 56
See application file for complete search history.

(56) References Cited

U.S. PATENT DOCUMENTS

| | | | |
|---|---|---|---|
| 4,372,681 A | 2/1983 | Sallenbach | 356/72 |
| 4,695,954 A | 9/1987 | Rose et al. | 221/15 |
| 4,732,411 A | 3/1988 | Siegel | 283/75 |
| 4,918,604 A | 4/1990 | Baum | 221/5 |
| 5,048,870 A | 9/1991 | Mangini et al. | 283/81 |
| 5,390,796 A | 2/1995 | Kerfoot, Jr. | 206/534 |
| 5,597,995 A | 1/1997 | Williams et al. | 235/375 |
| 5,752,723 A | 5/1998 | Robertson | 283/67 |
| 5,839,836 A | 11/1998 | Yuyama et al. | 400/62 |
| 5,884,273 A | 3/1999 | Sattizahn et al. | 5/724 |
| 5,905,652 A | 5/1999 | Kutsuma | 700/235 |
| 5,961,151 A | 10/1999 | Tung et al. | 283/56 |
| 6,036,017 A | 3/2000 | Bayliss, IV | 206/534 |
| 6,036,231 A | 3/2000 | Foote et al. | 283/67 |
| 6,112,182 A * | 8/2000 | Akers et al. | 705/2 |
| 6,149,518 A | 11/2000 | Farrow | 462/27 |
| 6,155,485 A * | 12/2000 | Coughlin et al. | 235/383 |
| 6,260,761 B1 * | 7/2001 | Peoples, Jr. | 235/462.07 |
| 6,304,849 B1 * | 10/2001 | Uecker et al. | 705/3 |
| 6,330,351 B1 | 12/2001 | Yasunaga | 382/141 |
| 6,386,367 B1 | 5/2002 | Bayliss, IV | 206/534 |

(Continued)

*Primary Examiner*—Andrew H. Hirshfeld
*Assistant Examiner*—Wasseem H. Hamdan
(74) *Attorney, Agent, or Firm*—Ernest D. Buff & Associates, LLC; Ernest D. Buff; Theodore J. Pierson

(57) ABSTRACT

A prescription drug printing machine is used by a physician in connection with prescribing one or more prescription drugs to a patient. The printing machine has a memory unit that contains a database of information on all known available prescription drugs, including a colored pictorial representation of each of the available drugs. Each of the colored pictorial representations is a substantially similar replica of the drug it depicts. Preferably, the colored pictorial representation is an exact replica of the actual drug, containing the drug's exact color, shape and size. The printing device includes a first and second printing means for printing a prescription drug form and a patient receipt, respectively. Both of the prescription drug form and the patient receipt include the name of the drug, a colored pictorial representation, and other information. The prescribing physician inspects each of these documents for accuracy before handing them both over to the patient. Patients remit their prescription drug form to a pharmacist and retain the patient receipt for comparison with drugs that are prepared for them by the pharmacist. The printing machine has storage means for storing information concerning the prescription drug form in the memory unit of the printer, in order to keep accurate patient records. The printing device optionally includes translating means for translating the prescription drug information into a foreign language.

20 Claims, 1 Drawing Sheet

U.S. PATENT DOCUMENTS

| | | | |
|---|---|---|---|
| 6,550,618 B1 | 4/2003 | Peterson | 206/534 |
| 6,649,007 B1 | 11/2003 | Key | 156/249 |
| 2003/0189058 A1 | 10/2003 | Liff et al. | 221/13 |
| 2003/0189732 A1 | 10/2003 | Bean et al. | 358/302 |
| 2003/0193185 A1 | 10/2003 | Valley et al. | 283/81 |
| 2003/0214129 A1 | 11/2003 | Adler | 283/81 |

* cited by examiner

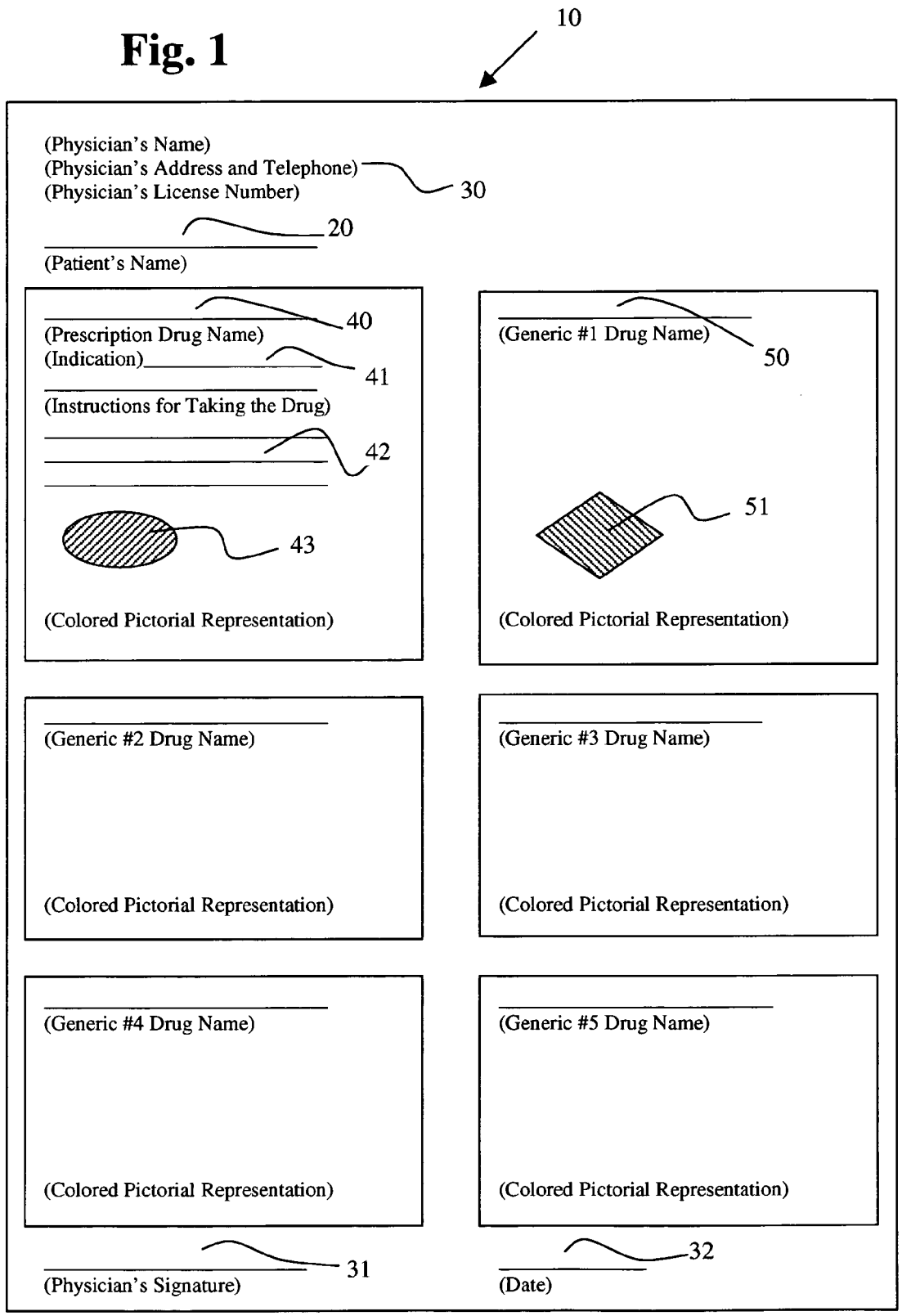

PRESCRIPTION DRUG PRINTER WITH DRUG VERIFICATION INDICIA AND METHOD FOR USE THEREOF

BACKGROUND OF THE INVENTION

1. Field of the Invention

The present invention relates to the field of prescription drug printers; and more particularly, to a prescription drug printer which utilizes drug verification indicia having a colored pictorial representation of the prescribed drug.

2. Description of the Prior Art

Recent developments in pharmaceutical research have developed a large and ever-expanding body of drugs to treat a large variety of medical conditions. Each year hundreds of thousands of prescription drugs are prescribed by physicians around the world for the treatment of their patients. The process usually involves the following steps. After a physician has evaluated and diagnosed the medical condition of his patient, he selects an appropriate drug, if necessary, for the treatment of the patient. The physician then writes a prescription in order for the patient to obtain the drug. Writing the prescription usually involves the physician handwriting the name of the drug, the dosages, and the instructions for taking the drug onto a sheet of paper from a prescription drug pad, and then signing it. The patient then takes this document to a pharmacy where it is handed over to the pharmacist on duty. The pharmacist then reads the prescription, handles any issues regarding patient health insurance, checks for dangerous complications caused by drug interactions, and then fills the prescription. The prescription is then retrieved by the patient, whereupon the patient begins to take the drug, following the instructions from the physician, which usually accompanies the prescription drug by way of a label affixed to the device that holds the drug.

Because many physicians have poor or otherwise illegible handwriting, there exist numerous instances where the pharmacist who is filling the prescription has trouble reading and understanding what drug the physician has prescribed. Because of the heavy work load and time pressures faced by many pharmacists, hasty decisions are occasionally made as to the interpretation of the physician's handwriting without contacting the physician in order to verify these conclusions. The end result is that many times the pharmacist fills the prescription with a different drug than was instructed by the patient's physician. Taking the wrong drug can be life threatening. Unfortunately, the patient has nothing with which to verify that the drug received from the pharmacist matches the original prescription drug form signed by the physician. The patient only receives one copy of the prescription form, which he must then remit to the pharmacist and which he does not get back or ever see again after he picks up the drug.

Prescription drug verification is a major problem affecting both the pharmacist and the patient. Information relevant to attempts to address these problems can be found in U.S. Pat. Nos. 4,372,681; 4,696,954; 4,732,411; 4,918,604; 5,048,870; 5,390,796; 5,597,995; 5,752,723; 5,839,836; 5,884,273; 5,905,652; 5,961,151; 6,036,017; 6,036,231; 6,149,518; 6,330,351; 6,386,367; 6,550,618; and 6,649,007, as well as U.S. Patent Application Nos. US 2003/0189058; US 2003/0189732; US 2003/0193185; and US 2003/0214129. However, each one of these references suffers from one or more of the following disadvantages: (i) the verification indicia is not created by the prescribing physician, but instead by the pharmacist; (ii) only one sheet of paper having the verification indicia is created, so that there exists no additional copy to use as a receipt for the patient to retain; (iii) the verification indicia does not include a substantially similar colored pictorial representation of the prescription drug, or alternatively an exact replica; (iv) there exists no storage means by which to store the prescription drug form information for each patient the physician treats; (v) there exists no translation means by which to create a foreign translated version of the verification indicia and other information for inclusion on the patient receipt.

For the foregoing reasons, there remains a need in the art for a prescription drug printer that prints out a prescription drug form as well as a patient receipt, both of which include clear textual identification of the drug along with a substantially similar colored pictorial representation of the drug, and preferably an exact size replica, so that the pharmacist can verify that the drug he is filling is indeed the same drug that was prescribed by the physician and, also, so that the patient can verify that the drug he is receiving from the pharmacist is the same drug that was prescribed by his physician.

SUMMARY OF THE INVENTION

The present invention provides a prescription drug printing device with drug verification indicia used by a physician when prescribing for a patient one or more prescription drugs, having a specific color, shape and size. The invention includes a printer having a memory unit that contains a database of information on all known available prescription drugs, including a colored pictorial representation of each of the available drugs. The colored pictorial representation is a substantially similar replica of each of the available drugs, including the color, shape and size of each drug, or an exact replica. A first printing means is provided for printing a prescription drug form that includes information about the prescribed drug, together with the colored pictorial representation of the prescribed drug. A second printing means is provided for printing a receipt for the patient comprising the name of the prescribed drug, the information about the prescribed drug and the colored pictorial representation of the prescribed drug. Preferably, the colored pictorial representation printed by the first and second printing means is an exact size replica of the prescribed drug. The prescription drug printing device includes storage means for storing the information of the prescription drug form in the memory unit of the printer, in order to keep accurate patient records. Preferably, each of the prescription drug form and patient receipt are printed on non-adhesive paper. Optionally, the device includes translation means for creating a foreign translated version of the verification indicia for inclusion on the patient receipt.

The invention includes a method of using the prescription drug printing device, which includes the following steps. The physician selects the prescription drug for treatment of the patient. The physician inputs the selected drug identification to the printing device. The physician waits for the first printing means to print the prescription drug form. The physician waits for the second printing means to print the receipt for the patient. The physician reviews the prescription drug form for accuracy and signs it. The physician reviews the patient receipt for accuracy. Lastly, the physician hands both the prescription drug form and patient receipt over to the patient.

The present invention solves the problems associated with improper prescription drug filling, primarily caused by a deficiency in the chain of communication from the physician to the pharmacist to the patient, and also from a lack of adequate verification indicia. The present invention comprises a prescription drug printing device having a memory unit, first and second printing means, storage means, and, optionally, translation means. Drug verification indicia, which includes a substantially similar pictorial representation of the prescription drug, and preferably an exact size replica thereof, is printed on both a prescription drug form and a patient receipt.

BRIEF DESCRIPTION OF DRAWING

The invention will be more fully understood and further advantages will become apparent when reference is had to the following detailed description of the preferred embodiments of the invention and the accompanying drawing, in which:

FIG. 1 depicts one embodiment of the prescription drug form generated by the printing device.

DESCRIPTION OF THE PREFERRED EMBODIMENTS

Generally stated, the invention relates to a printer comprising a memory unit that contains information including a colored pictorial representation of all currently available prescription drugs. Upon deciding that proper treatment of a patient includes the administration of a prescription drug, the physician prints out a prescription drug form from the printer. The form has verification indicia that includes information about the prescribed drug, together with a colored picture of the drug. Significantly, the colored picture is either an exact replica of the prescribed drug or a substantially similar replica. The physician reviews the form for accuracy; signs the form; and then gives the form to the patient to fill the prescription at a pharmacy. In addition, the printer prints out a receipt for the patient. The receipt comprises the name of the drug, information about the drug, and a colored picture of the drug. The patient keeps the receipt and is able to compare the picture of the prescription drug on the receipt with the drug being dispensed by the pharmacist to ensure that the drug dispensed is identical to that prescribed by the physician. Further, the printer has the capability of storing information concerning the prescription form in the printer's memory for patient records.

The prescription drug printer with drug verification indicia prevents therapeutic misadventure by allowing a patient to compare the prescribed drug, as dispensed by a pharmacist, with an exact, or substantially similar, representation of the drug, as prescribed for the patient at a physician's office. The physician, and not the pharmacist, is the operator of the printing device, which resides in his office. The physician is able to produce documents, in his own office, which have clear identification indicia of the prescribed drug. He then inspects the prescription form before signing it and handing it to the patient. In addition, a receipt is also handed to the patient, so that the patient can hold on to a copy of the drug identification information, which includes the colored pictorial representation. Upon receiving the drugs from the pharmacist, the patient compares the drug with the receipt to ensure that it is the same drug that was prescribed by his physician. Mistakes attendant to improper prescription drug filling, tracked from the physician's authorization, are obviated. Many problems may arise during the chain of communication of the prescription from physician to patient. This transmission must pass along the following path: the physician records the prescription, the pharmacist identifies the prescribed drug, the pharmacist fills the prescription, and the patient picks up the prescription drugs.

The prescription drug printing device of the present invention includes various components which operate as a whole to print a prescription drug form and a patient receipt, as well as to store this information in order to keep accurate patient records. The printing device utilizes a color printer with an internal memory unit that contains a database of information on all known available prescription drugs. The printer may be one of the following types: color laser printer, ink-jet printer, dot-matrix printer, and the like, or any other suitable equivalent now known or hereafter developed. The memory unit further contains a colored pictorial representation of each and every known available prescription drug.

The prescribed drug may take any one of many different forms including: tablets or pills, liquid oral medications, topical creams, liquid drops, inhalants, and the like. If the prescribed drug is a tablet, then the colored pictorial representation is of the tablet itself. However, if the prescribed drug is a liquid oral medication, topical cream, liquid drop, inhalant, or the like, then the colored pictorial representation is of the device in which that drug is stored. In this respect, the present invention operates in the same manner to ensure proper drug verification by the patient. However, because a pictorial representation of the drug would be useless or unfeasible in some cases, the pictorial representation is sometimes of the device that houses the drug, instead of the drug itself.

Each of the colored pictorial representations is a substantially similar replica of each of the drugs found in the database. The pictorial representation has a substantially similar color to the drug, having a deviation in color not to exceed plus or minus 25 nm of electromagnetic radiation. The pictorial representation is substantially the same size as the drug, having a deviation in scaling not to exceed plus or minus 25%. The pictorial representation has substantially the same shape as the drug. These range limitations are critical to the present invention so that the indicia are suitable for properly identifying the prescribed drug. In a preferred embodiment of the present invention, the pictorial representation is an exact replica of the drug, having the exact color, size and shape as the actual drug being prescribed. If the pictorial representation depicts the device that houses the drug, then it is preferable that such pictorial representation have the exact color and shape. Because of the limited size of the prescription drug forms, there may be occasions when the size shown is a scaled down version of the actual size of the storage device.

The memory unit which is housed in the printer is comprised of any type of computer hard drive, of the type known to one skilled in the art. The memory unit is of adequate capacity to permit storage substantially all relevant information pertinent to substantially all known available prescription drugs. This information includes the name of the drug, its indication, its possible side effects, directions for its normal use, and a colored pictorial representation of the drug. The memory unit is operable to accommodate additions by way of new prescription drugs as they become known and available as a prescription. Therefore, the memory unit has extra space, which can be utilized when necessary to increase the number of prescription drugs found in the prescription drug information database.

The printing device includes a first printing means for printing a prescription drug form that includes information about the prescribed drug, together with the colored pictorial representation of the prescribed drug. The prescription drug form is described in more detail hereinbelow.

The printing device includes a second printing means for printing a receipt for the patient comprising the name of the prescribed drug, information about the prescribed drug and the colored pictorial representation of the prescribed drug. The patient receipt is described in more detail hereinbelow.

The printing device includes a storage means for storing information of the prescription drug form in the memory unit of the printer, in order to keep accurate patient records. These patient records that are stored in the printing device include a full history of the drugs prescribed by a physician using that printing device for each of his patients. Such records may include the dates of the prescriptions, the name of the drugs, and other relevant information.

FIG. 1 depicts one embodiment of the prescription drug form, shown generally at 10, generated by the printing device of the present invention. In the embodiment shown, the prescription drug form has several spaces to allow for generic equivalents to the prescribed drug. It is noted that another embodiment of the present invention exists wherein the prescription drug form is devoid of such information regarding generic equivalents. A more detailed description relating to generic equivalents is discussed below.

The prescription drug form is printed onto paper of the type generally used for this purpose, although it may be of any type and size that is suitable for use with the printer of the present invention. The prescription drug form contains information regarding the name of the drug 40, a colored pictorial representation of the drug 43, and other information that may be useful for the pharmacist filling the prescription. The colored pictorial representation of the drug 43 is printed on the form in accordance with the specifications previously called for above. For illustrative purposes, a hypothetical pictorial representation of a drug is shown at 43 as a shaded, oval-shaped pill. The shading at 43 indicates the presence of coloring of the desired prescription drug. Other information that may be printed on the form includes: the patient's name 20, the physician's name, address and telephone number, and license number, collectively at 30, the drug name 40, the indication of the drug 41, the physician's instructions for taking the drug 42, possible side effects (not shown), and the like. The first and second printing means can be altered according to the amount and type of printed information that is desired and/or required to be printed on the forms.

The prescription drug form shall meet all of the requirements governing prescription drugs set forth by the United States federal government, the Food and Drug Administration, the American Medical Association, and the like. Alternatively, the prescription drug form meets all of the requirements set forth by the country in which the invention is used, or in which the prescription is filled. These requirements may be satisfied by adding to or altering the information contained on the prescription drug form, and will be known by those skilled in the art.

The prescription drug form is retrieved and inspected for accuracy by the prescribing physician before being signed 31 and dated 32 by that physician. The prescription drug form is then handed to the patient, who can then bring it to a pharmacist to have the prescription filled.

FIG. 1 shows a template of a prescription drug form having blank lines. During use, the printing device prints formatted text at the locations indicated by the blank lines. The text shown in parenthesis helps the pharmacist and/or patient to read and understand the forms, however, once in their completed format, the forms need not contain these phrases shown by FIG. 1.

Sometimes a physician permits the pharmacist to substitute the prescribed drug with a generic equivalent. Generally, the physician authorizes this by simply checking a box on the prescription form allowing for generic substitutions. In the present invention, a physician will have the same ability to allow for generic equivalents, while at the same time not limiting the effectiveness of the drug verification indicia taught by the present invention. If the physician allows for generic equivalents for the prescription, each of the first and second printing means will print several pictorial representations 51 of the drug for each of the recognized generic equivalents thereof. Either one, or preferably both, of the prescription drug form and patient receipt may include these additional pictorial representations 51. The colored pictorial representation of one of the generic equivalents of the prescribed drug is shown at 51 and is printed on the form in accordance with the specifications previously outlined above. For illustrative purposes, a hypothetical pictorial representation of one of the generic equivalents of the prescribed drug is shown at 51 as a shaded, diamond-shaped pill. Once again, the shading at 51 indicates the presence of coloring of the desired prescription drug.

FIG. 1 further depicts an embodiment wherein space for up to 5 generic drugs may be printed on the prescription drug form. In order to more clearly separate each of the generic drugs and prescribed drug, each drug is optionally enclosed within a rectangular border outline. Optionally, the prescription drug form may be devoid of such generic drug spaces. Alternatively, additional spaces (beyond those shown) may be provided with which to depict additional generic equivalents to the prescribed drug. The physician may optionally elect to give authorization for only one or more of the generic equivalents, and not all generic equivalents. Preferably, both the patient and the pharmacist will have means to allow for easy verification of the prescribed drug on their respective documents, in the form of colored pictorial representations 51 of all such acceptable generic equivalents. Because generic drug equivalents have essentially the same chemical composition, it is not necessary to repeat the indications and instructions for taking with each generic drug equivalent that is printed on the prescription drug form and/or patient receipt, as shown by FIG. 1. However, it is preferred to include the names 50 and colored pictorial representations 51 of the recognized generic equivalents in order to aid in their identification and verification.

By having all of the pertinent information about the prescribed drug printed on the forms, including a colored pictorial representation of the drug, the pharmacist is able to readily ascertain the identification of the drug being prescribed (and any suitable generic equivalent thereof) and accurately fill the prescription for the patient. The risks of filling the prescription with the wrong drug or other mishaps associated with sloppy or illegible physician's handwriting are obviated. The speed and efficiency by which the pharmacist is able to turn-around a request for a prescription is greatly enhanced.

The present invention provides for a patient receipt, so that the patient can identify the drug for himself and verify it with the prescription. The receipt is generated by the second printing means of the printing device and is retrieved by the physician. The patient receipt includes some or all of the information listed on the prescription drug form, and may include more information. Preferably, the patient receipt is an exact copy of the prescription drug form, shown by FIG. 1. The physician inspects the receipt for accuracy before handing it over to the patient, along with the prescription drug form. Because the patient receipt will not be submitted to the pharmacist filling the prescription, the receipt need not be signed by the physician. However, the receipt may be signed if the physician prefers. If the patient receipt is signed, however, then a proper designation must be included on the receipt, which identifies the fact that the document is only a receipt and not a prescription form. Preferably, the patient receipt is printed on paper in which both of its sides are non-adhesive. Adhesive paper is more expensive than non-adhesive paper, and there is no need for the patient receipt to be adhesive in the present invention.

The present invention assumes an English speaking physician, pharmacist, and patient. However, in another embodiment of the present invention, the printer includes translation means for translating the written prescription information into one of many different foreign languages, such as, Spanish, German, French, Chinese, Italian, and the like. Preferably, the translated words are printed only on the patient receipt, so that he may read about the indications of the drug, the directions for taking it, possible side effects, and so forth. Thus, the prescription drug form remains being printed with English words for the benefit of the pharmacist. Optionally, however, the prescription drug form may also be printed in the foreign language translation.

The present invention also provides for the method of use for the printing device. The method is described from the physician's point of view and includes the following steps: (i) selecting the prescription drug for treatment of said patient; (ii) inputting selected drug identification to the printing device; (iii) waiting for the first printing means to print the prescription drug form; (iv) waiting for the second printing means to print the receipt for the patient; (v) reviewing the prescription drug form for accuracy and signing thereon; (vi) reviewing the patient receipt for accuracy; and (vii) handing each of the prescription drug form and patient receipt to the patient. If the patient speaks a foreign language, then the first step of the aforementioned method would be to ascertain that foreign language, and then input the identity of that language into the translating means. The preferred user of the system is a physician treating a patient, although any other medical professional being licensed to prescribe drugs may use the system.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A prescription drug printing device having drug verification indicia used by a physician in connection with prescribing for a patient one or more prescription drugs, having a color, shape and size, comprising;
   a. a printer having a memory unit that contains a database of information on all known available prescription drugs, including a colored pictorial representation of each of said available drugs;
   b. said colored pictorial representation being a substantially similar replica of each of said available drugs, including the color, shape and size of each drug;
   c. a first printing means for printing by said physician a prescription drug form that includes information about said prescribed drug, together with said colored pictorial representation of said prescribed drug;
   d. a second printing means for printing by said physician a receipt for said patient comprising the name of said prescribed drug, said information about said prescribed drug and said colored pictorial representation of said prescribed drug; and
   e. storage means for storing by said physician said information of said prescription drug form in said memory unit of said printer, in order to keep accurate records for said patient.

2. A prescription drug printing device as recited by claim 1, wherein said colored pictorial representation has a deviation in color not to exceed plus or minus 25 nm of electromagnetic radiation of the actual color of said prescribed drug.

3. A prescription drug printing device as recited by claim 1, wherein said pictorial representation has substantially the same shape as said prescribe drug.

4. A prescription drug printing device as recited by claim 1, wherein said colored pictorial representation is substantially the same size as said drug, having a deviation in scaling not to exceed plus or minus 25% of the actual size of said prescribed drug.

5. A prescription drug printing device as recited by claim 1, wherein said colored pictorial representation is an exact replica of said prescribed drug, including the exact size, shape and color of said prescribed drug.

6. A prescription drug printing device as recited by claim 1, wherein said prescribed drug is a tablet.

7. A prescription drug printing device as recited by claim 1, wherein said prescribed drug is a liquid oral medication being stored in a device, and said colored pictorial representation depicts said storage device.

8. A prescription drug printing device as recited by claim 1, wherein said prescribed drug is a topical cream being stored in a device, and said colored pictorial representation depicts said storage device.

9. A prescription drug printing device as recited by claim 1, wherein said prescribed drug comprises liquid drops being stored in a device, and said colored pictorial representation depicts said storage device.

10. A prescription drug printing device as recited by claim 1, wherein said prescribed drug comprises an inhalant being stored in a device, and said colored pictorial representation depicts said storage device.

11. A prescription drug printing device as recited by claim 1, wherein said second printing means prints colored pictorial representations of all known generic equivalents of said prescribed drug onto said patient receipt.

12. A prescription drug printing device as recited by claim 1, wherein each of said first and second printing means prints colored pictorial representations of all known generic equivalents of said prescribed drug onto said prescription drug form and patient receipt, respectively.

13. A prescription drug printing device as recited by claim 1, further comprising a translating means adapted to translate said prescription drug information into a foreign language translation for printing onto said patient receipt.

14. A method for using said prescription drug printing device of claim 13 in order to prescribe for a patient one or more prescription drugs, comprising the steps of:
   a. ascertaining said foreign language of said patient;
   b. inputting said foreign language identity into said translating means;
   c. selecting said prescription drug for treatment of said patient;
   d. inputting selected drug identification to said printing device;
   e. waiting for said first printing means to print said prescription drug form;
   f. waiting for said second printing means to print said receipt in said selected foreign language for said patient;

g. reviewing said prescription drug form for accuracy and signing thereon;

h. reviewing said patient receipt for accuracy; and i. handing each of said prescription drug form and patient receipt to said patient.

15. A prescription drug printing device as recited by claim 1, further comprising a translating means for translating said prescription drug information into a foreign language translation for printing onto each of said patient receipt and said prescription drug form.

16. A prescription drug printing device as recited by claim 1, wherein said printer is a color laser printer.

17. A prescription drug printing device as recited by claim 1, wherein said printer is an ink-jet printer.

18. A prescription drug printing device as recited by claim 1, wherein said printer is a dot-matrix printer.

19. A prescription drug printing device as recited by claim 1, wherein said patient receipt is printed on a document having a top side and a bottom side, each of said top and bottom sides being non-adhesive, respectively.

20. A method for using said prescription drug printing device of claim 1 in order to prescribe for a patient one or more prescription drugs, comprising the steps of:

a. selecting said prescription drug for treatment of said patient;

b. inputting selected drug identification to said printing device;

c. waiting for said first printing means to print said prescription drug form;

d. waiting for said second printing means to print said receipt for said patient;

e. reviewing said prescription drug form for accuracy and signing thereon;

f. reviewing said patient receipt for accuracy; and g. handing each of said prescription drug form and patient receipt to said patient.

* * * * *